US008013944B2

(12) United States Patent
Roosendaal et al.

(10) Patent No.: US 8,013,944 B2
(45) Date of Patent: Sep. 6, 2011

(54) DISPLAY DEVICE FOR REDUCING CROSS-TALK BETWEEN DISPLAYED IMAGES

(75) Inventors: Sander Jurgen Roosendaal, Eindhoven (NL); Gerwin Karman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 255 days.

(21) Appl. No.: 11/577,736

(22) PCT Filed: Oct. 20, 2005

(86) PCT No.: PCT/IB2005/053436

§ 371 (c)(1), (2), (4) Date: Aug. 7, 2009

(87) PCT Pub. No.: WO2006/046174

PCT Pub. Date: May 4, 2006

(65) Prior Publication Data

US 2009/0303401 A1 Dec. 10, 2009

(30) Foreign Application Priority Data

Oct. 25, 2004 (EP) .................................... 04105267

(51) Int. Cl.
*G02F 1/1335* (2006.01)

(52) U.S. Cl. ........................................... 349/15; 349/57

(58) Field of Classification Search .................. 359/227, 359/613; 349/15, 57, 129; 348/835; 345/32, 345/102

See application file for complete search history.

(56) References Cited

U.S. PATENT DOCUMENTS

| | | | | |
|---|---|---|---|---|
| 5,917,562 | A * | 6/1999 | Woodgate et al. | 349/15 |
| 5,936,596 | A | 8/1999 | Yoshida et al. | |
| 6,046,787 | A * | 4/2000 | Nishiguchi | 349/129 |
| 6,128,059 | A * | 10/2000 | Nishiguchi | 349/129 |
| 6,377,295 | B1 * | 4/2002 | Woodgate et al. | 348/59 |
| 2003/0007227 | A1 | 1/2003 | Ogino | |
| 2003/0067432 | A1 | 4/2003 | Watanabe et al. | |

FOREIGN PATENT DOCUMENTS

| | | |
|---|---|---|
| DE | 19920789 | 5/2000 |
| DE | 10142958 | 2/2002 |
| DE | 10140688 | 3/2003 |

(Continued)

OTHER PUBLICATIONS

S. Stallinga: "Equivalent Retarder Approach to Reflective Liquid Crystal Displays", Journal of Applied Physics, vol. 86, No. 9, pp. 4756-4766, 1999.

*Primary Examiner* — Akm E Ullah
(74) *Attorney, Agent, or Firm* — Larry Liberchuk

(57) ABSTRACT

The present invention relates to a display device, intended to display different images in different angular regions in front of the display, i.e. a first image to the right and a second image to the left. The display device therefore comprises an imaging layer and a light directing layer, comprising e.g. cylindrical lenses. In order to avoid cross-talk close to where the different regions intersect, the imaging layer comprises liquid crystal cells, which, close to the normal direction of the imaging layer have low contrast and/or brightness. This substantially eliminates cross-talk between the two displayed images.

11 Claims, 4 Drawing Sheets

FOREIGN PATENT DOCUMENTS

| | | |
|---|---|---|
| EP | 1154307 | 11/2001 |
| EP | 1352784 | 10/2003 |
| JP | 06230738 | 8/1994 |
| JP | 2000137443 | 5/2000 |
| JP | 2002350772 | 12/2002 |
| JP | 2002099223 | 12/2007 |
| WO | 03030130 | 4/2003 |
| WO | 2005019919 | 3/2005 |
| WO | 2005031444 | 4/2005 |

* cited by examiner

DISPLAY DEVICE FOR REDUCING CROSS-TALK BETWEEN DISPLAYED IMAGES

The present invention relates to a display device comprising an imaging layer with a plurality of picture elements, disposed in a plane, and a light directing layer, comprising a plurality of optical elements, for projecting light from different picture elements in the imaging layer to the left and right, respectively, as seen from a direction close to the normal of said plane.

Such a device, using cylindrical lenses as the optical elements, is disclosed in DE, 19920789, A1. This arrangement allows e.g. the driver of a vehicle to see an image comprising driving related information when watching a display, whereas, at the same time, a passenger, having a different angular relation to the display, sees a completely different image, for instance a movie, or the like. In two different angular regions, left and right regions, two different images may thus be produced with a single display, in left and right channels.

Such a display may however produce a distorted image at an angle close to the boundary between the two regions, due to cross-talk between the two channels. Then a user watching the display in the right region, but close to the boundary, will also see some content intended for the left channel and vice versa.

It is an object of the present invention to provide a display device of the initially mentioned type with reduced or eliminated cross-talk.

This object is achieved by a display device according to claim 1.

More specifically the invention relates to a display device, comprising an imaging layer with a plurality of picture elements, disposed in a plane, and a light directing layer, comprising a plurality of optical elements, for projecting light from different picture elements in the imaging layer to the left and right, respectively, as seen from an intermediate direction at or close to the normal of said plane, wherein each picture element comprises an LCD element, which is arranged to have lower contrast and or brightness at a viewing angle close to said intermediate direction than at a viewing angle further away from said intermediate direction.

This means that substantially no information will be sent out in the intermediate direction, which substantially eliminates the risk for cross-talk between the two channels.

In a preferred embodiment, the LCD element may be a non-twisted liquid crystal cell, having rear and front orientation layers with parallel rubbing directions.

Preferably, the LCD element is a non-twisted liquid crystal cell between crossed rear and front polarisers. This means that the display will appear black in the normal direction.

In an alternative embodiment the LCD element is a non-twisted liquid crystal cell between parallel polarisers.

Preferably, the rubbing direction of the rear orientation layer is parallel with the polarising direction of the rear polariser.

As an alternative, the rubbing direction of the rear orientation layer may be perpendicular to the polarising direction of the rear polariser.

In another preferred embodiment, the LCD element is a twisted liquid crystal cell, having a retardation value less than 450 nm in said intermediate direction. This cell is also capable of producing the desired effect.

Preferably then, the midplane director of the liquid crystal cell's liquid crystal material is vertical as seen from a user, i.e. is oriented in the plane dividing the left and right views. This provides left-right symmetry. For example, if the two views are at +/−50° polar angle and at 0° and 180° azimutal angle (i.e. "3 o'clock" and "9 o'clock"), the plane dividing the two views is the plane in the "6 o'clock" and "12 o'clock" directions normal to the display, and then the mid-plane director is best oriented at 90° or 270° azimutal angle.

Preferably, the twisted nematic LCD cell is driven with a minimum absolute driving voltage, which is greater than 0V, providing a sufficiently high mid-plane director tilt angle. Alternatively, a high pretilt value may be used providing the same effect, i.e. to ensure a minimal light modulation in the normal direction.

The optical elements may preferably comprise cylindrical lenses to create the different left/right views.

Alternatively, the optical elements comprise vertical slits in a barrier.

The display device may be symmetric in the left-right direction. Then the intermediate direction coincides with the normal of the imaging layer.

These and other aspects of the invention will be apparent from and elucidated with reference to the embodiments described hereinafter.

FIG. 1 illustrates schematically the generation of a composite image for use in a display device according to an embodiment of the invention.

The display device is intended to display a first image 1 in a first direction, e.g. to the left (L), and a second image 2 in a second direction, e.g. to the right (R) as seen from a user. The images are thus displayed in left and right channels, respectively.

Such a display may for instance be used in a vehicle. Then, the driver, when watching the display, sees driver specific information, such as data from a vehicle computer, e.g. speed, fuel consumption or car navigation information in the first image 1. At the same time a passenger, placed at the drivers side and watching the same display, sees the second image 2, which may for instance relate to a movie or a web browser screen.

Another application of the display device according to an embodiment of the invention is as an autostereoscopic 3D display. Then, instead of displaying the first image 1 to a driver and the second image 2 to a passenger, the first and second images 1, 2 are displayed to the left and right eyes, respectively, of a user. By an autostereoscopic 3D display is meant a 3D display that does not require the user to wear special glasses or the like.

In order to make such an effect possible, a composite image 3 is created from the first and second images 1, 2. This is done by dividing the first and second images 1, 2 in vertical strips L1, L2, . . . etc, and R1, R2, . . . etc., respectively. The strips may be one or more picture elements (pixels) wide. These strips are then interleaved into a composite image 3 comprising e.g., as illustrated, from left to right: the leftmost slice R1 from the second image 2, the leftmost slice L1 from the first image 1, the second leftmost slice R2 from the second image 2, and so on. This composite image 3 may be displayed with an imaging layer, comprising a plurality of picture elements, disposed in a plane.

The display device further comprises a light directing layer for projecting light from different picture elements (relating to the first and second images 1, 2) in the imaging layer to the left and right, respectively.

Figure 1:
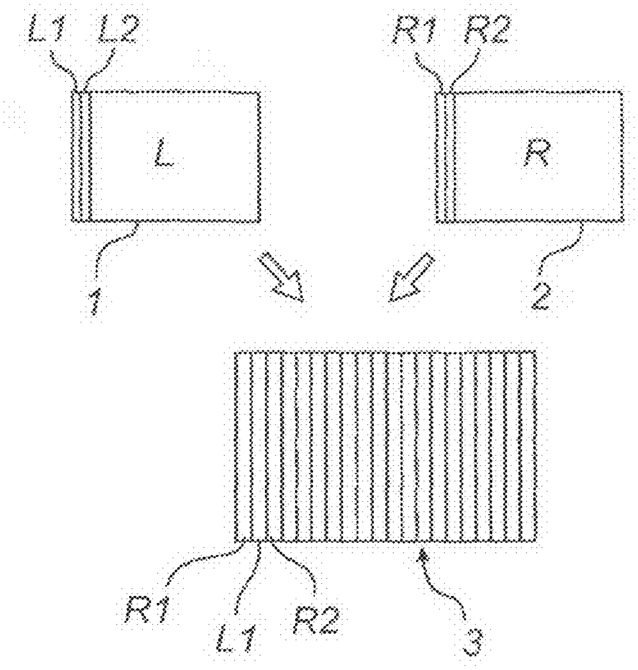
FIG. 1 illustrates schematically the generation of a composite image.
Figure 2:
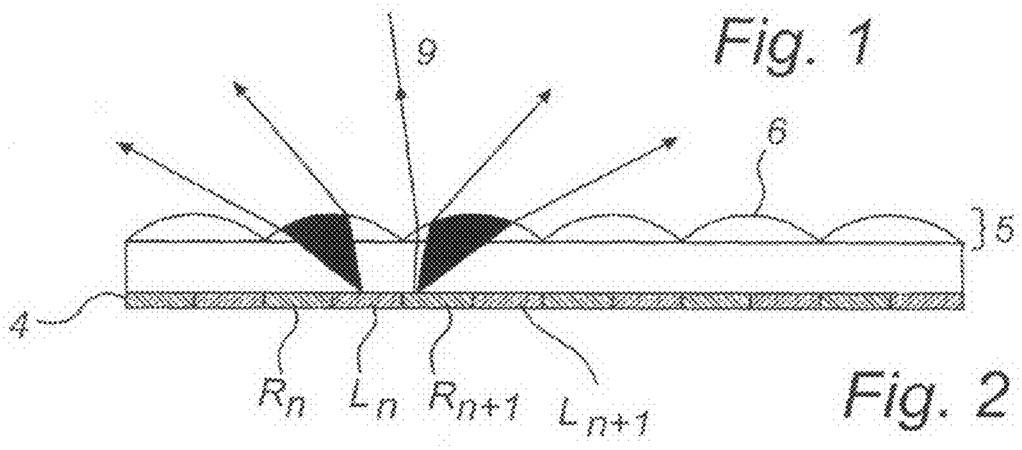
FIG. 2 illustrates a light directing layer, according to a first embodiment of the invention.

FIG. 2 illustrates a cross section of a display device, having a light directing layer according to a first embodiment of the invention. The display device then comprises an imaging layer 4, having a plurality of pixels, arranged in a matrix. The display device may further comprise a backlighting arrangement.

As will be described more detailed later, the imaging layer is a liquid crystal display. Each pixel thus comprises at least one LCD cell. The pixels are divided into left and right image strips L, R, L, R, etc., each having a width of one or more pixels. The light directing layer 5, which is placed at a small distance from the imaging layer 4, includes a number of cylindrical lenses 6, much like in a so-called 3D postcard. The distance between the LC layer an the lens is approximately equal to the focal length of the lens. Typical parameters may be: glass thickness 0.9 mm, lens radius of curvature 0.4 mm, and pixel pitch 0.3 mm. However, in practice the parameters may be varied to a considerable extent, depending on the requirements of the display.

The positional relationship between the lenses and the imaging layer strips is made such, that the lenses project light from left image strips L to the left (as seen from the user) and right image strips to the right.

Figure 3:
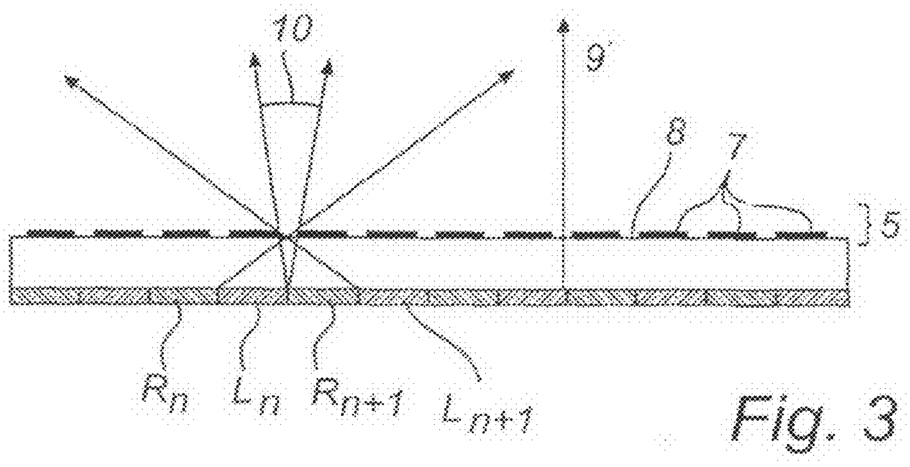
FIG. 3 illustrates a light directing layer, according to a second embodiment of the invention.

FIG. 3 illustrates a light directing layer, according to a second, alternative embodiment of the invention. This embodiment corresponds to the first embodiment described in connection with FIG. 2, with the exception that the light directing layer 5' instead comprises a barrier 7, having a plurality of optical elements in the form of vertically oriented slits 8. The positional relationship between the slits 8 of the barrier 7 and the imaging layer strips is made such, that light from the left image strips L are transmitted to the left but blocked to the right (as seen from the user), and vice-versa. The light directing layers 5, 5' in FIGS. 2 and 3 provide a directional filtering, projecting predominantly light from the left image to the left and from the right image to the right.

As can be seen in FIGS. 2 and 3 light emitted parallel to or close to parallel to the normal of the LCD cell plane may however not be subjected to this filtering effect, as is illustrated with the light beams 9, 9' in FIGS. 2 and 3, respectively. Therefore, when using conventional LCDs with such filtering arrangements, a substantial cross-talk between the right and left channel will be experienced at viewing angles close to the above mentioned normal. This means, for example, that in the above mentioned vehicle application, the back seat passengers may see a distorted and perhaps incomprehensible image, due to the influence of the image data intended for the driver of the vehicle.

It does not appear impossible to reduce or eliminate this effect by utilising additional filters or grids. However, this would be complicated and would probably disturb the viewing properties in other directions.

In accordance with the present invention this problem is instead solved by providing the LCD cells of the imaging layer with properties that would seem highly undesirable in most conventional LCD applications, namely reduced or eliminated brightness and/or contrast in the viewing direction corresponding to a direction close to the normal of the imaging layer plane. This means that no or very little image information is emitted at near normal viewing angles e.g. in the viewing angle 10 indicated in FIG. 3, which substantially eliminates any cross-talk. In some applications the display may preferably be slightly asymmetrical, i.e. the minimum contrast may not be achieved at the normal direction, but at direction to the right or left close to the normal. A deviation of up to 5°-10° may be provided by proper adjustment of the LCD parameters, preferably in the second embodiment described below.

Two different LCD cell embodiments, both capable of providing the desired effect will now be described.

Figure 8:
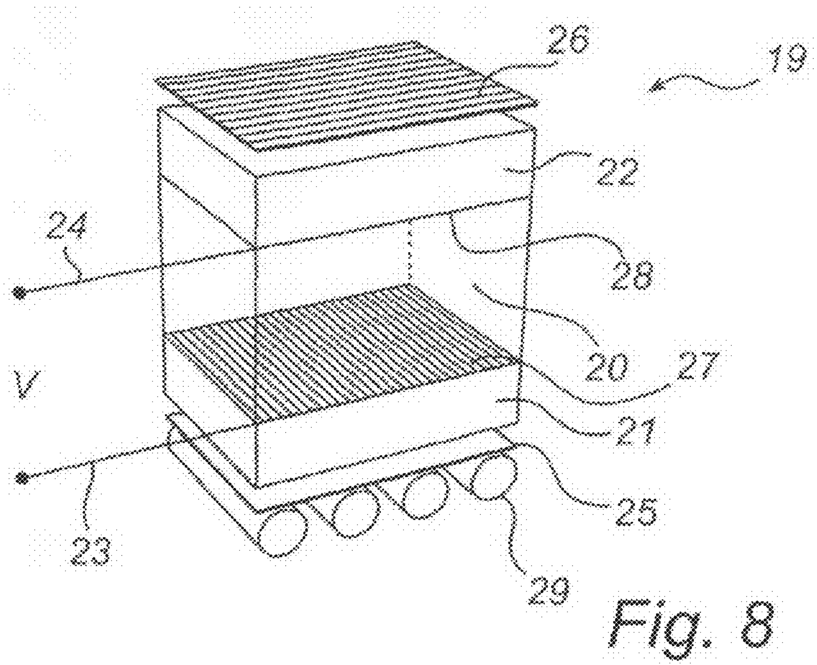
FIG. 8 illustrates a general liquid crystal (LC) cell.

Similar to a conventional LCD cell 19, an LCD cell used in embodiments of the invention comprises, as is schematically illustrated in FIG. 8, a liquid crystal (LC) material 20, enclosed between rear 21 and front 22 substrates, and electrodes 23, 24 for influencing the orientation of the LC molecules. The cell further comprises rear 25 and front 26 polarisers, as well as rear 27 and front 28 orientation layers, serving to apply predetermined orientation directions to the LC material in a relaxed state, i.e. when no voltage is applied to the electrodes 23, 24. The cell receives light from a backlighting arrangement 29. Addressing features for the cell may be accomplished in conventional ways, i.e. active mode, passive mode, etc, although in the second embodiment special driving voltages should be chosen.

The definition of angles in this description is as follows in relation to the vehicle display example. Azimutal angles range from 0°, pointing to the right (3 o'clock) as seen from the driver or passenger, via 90° pointing towards the ceiling of the car (12 o'clock), via 180°, pointing towards the left (9 o'clock), via 270°, pointing towards the car floor (6 o'clock), to 360° (=0°). Polar angles range from 0°, pointing in the normal direction of the display surface, towards the back seat of the vehicle, to 90°, pointing in the plane of the display. These polar and azimutal value ranges together cover all directions at the viewing side of the display.

In the first embodiment a non-twisted liquid crystal (LC) layer is disposed between first (rear) and second (front) crossed polarisers, and is aligned in such a way that the optical axis of the birefringent material is oriented in parallel with or perpendicular to the polarisers. This means that there will be no voltage depending optical effect applied in the normal direction of the plane of the LCD cell. If a voltage is applied, the refractive index may be changed, but the polarisation of the lights is not changed.

Under oblique angles however, the polarisation direction of the light will not be parallel to the liquid crystal material director, and light travelling in such angles experiences birefringence. Thus the polarisation of the light arriving at the front polariser will be depending on the applied voltage. Therefore the cell will have lower contrast at a viewing angle close to said normal than at a viewing angle further away from said normal.

A performed simulation illustrates this feature. The following LCD parameters have been used:

| | |
|---|---|
| K1 (splay elastic constant) | 11.7 pN |
| K2 (twist elastic constant) | 6.1 pN |
| K3 (bend elastic constant) | 16.5 pN |
| $\epsilon_\perp$ (perpendicular dielectric constant) | 3.2 |
| $\epsilon_\parallel$ (parallel dielectric constant) | 10.3 |

-continued

| | |
|---|---|
| $\Delta\epsilon$ (=$\epsilon\|\|$ − $\epsilon\perp$ = dielectric anisotropy) | 7.1 |
| d (LC layer thickness) | 6.0 μm |
| front director(azimutal orientation) | 90.0° |
| rear director(azimutal orientation) | 90.0° |
| twist angle | 0° |
| pretilt angle | 5.0° |
| $n_o$ (parallel refractive index) | 1.5 |
| $n_e$ (perpendicular refractive index) | 1.5804 |
| $\Delta n$ (=$n_e - n_0$ birefringence) | 0.0804 |
| d$\Delta$n (retardation) | 482.4 nm |
| dispersion | 0.015 |
| reference wavelength | 589 nm |
| polarizer(azimutal orientation) | 90° |
| analyzer(azimutal orientation) | 0° |

In this embodiment, the rear and front polarisers are crossed (perpendicular) which means that the display always will appear black in the directions where the polarisation is unaffected by the LC material, i.e. in the normal direction.

In an alternative embodiment the rear and front polarisers may be parallel. In this case, the cell will instead appear light in the normal direction. However, no signal will be emitted in the normal direction, since the transmission cannot be varied, and hence no signal, causing cross-talk, will still be transmitted.

Figure 4:
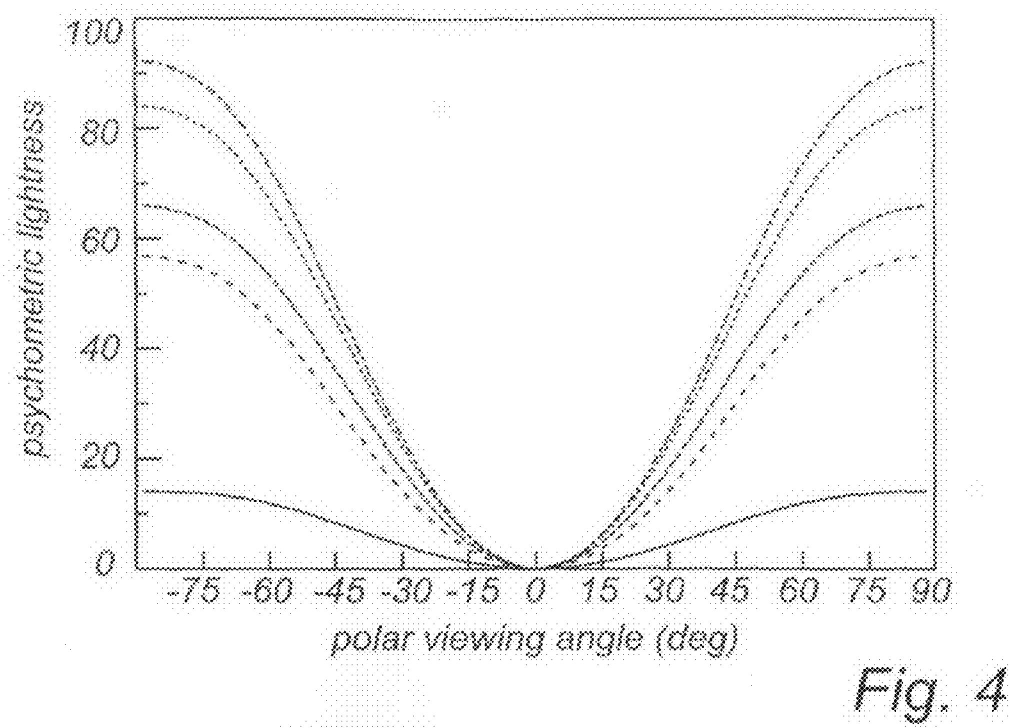
FIGS. 4 and 5 illustrate the results of a simulation of an LCD cell, designed for a display device in accordance with a first embodiment of the invention.
Figure 5:
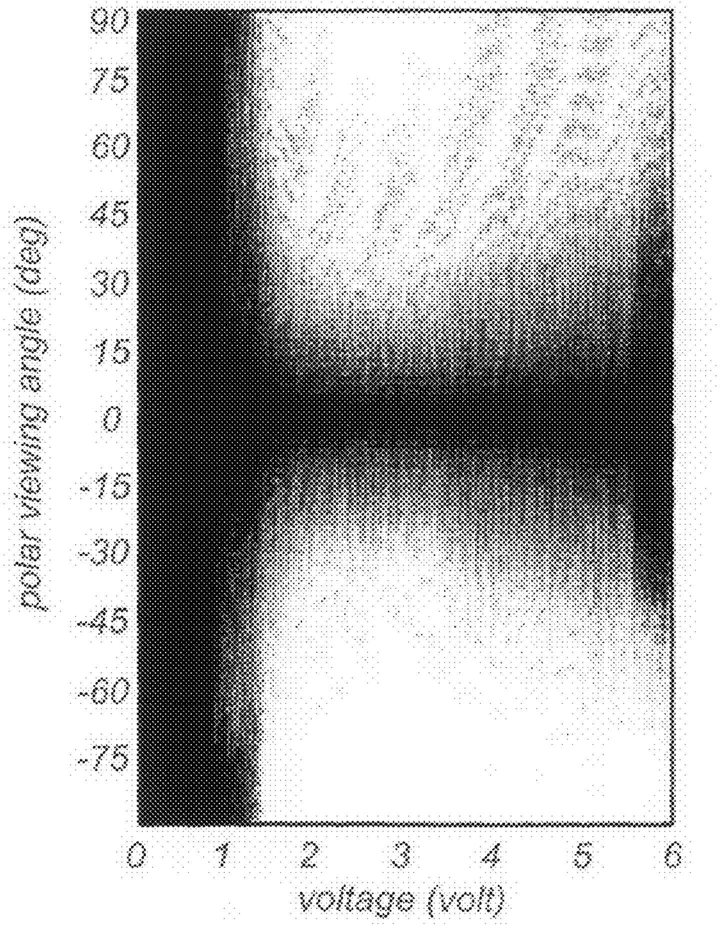

FIGS. 4 and 5 illustrate properties of the LCD cell having the properties of the above table. FIG. 4 illustrates the brightness, or more specifically the psychometric lightness (a defined non-linear function of the transmission), as a function of the polar viewing angle for different voltages and at 0°/180° azimutal viewing angle. As is clear from the image, the voltage to brightness dependence within the interval from −15° to +15°, i.e. around the display normal, is very low. This appears also in FIG. 5, where the brightness of the LCD cell, as a function of polar viewing angle, at zero azimutal angle, and applied voltage, is depicted as different grey-scales (the higher brightness the lighter grey-scale).

Figure 9:
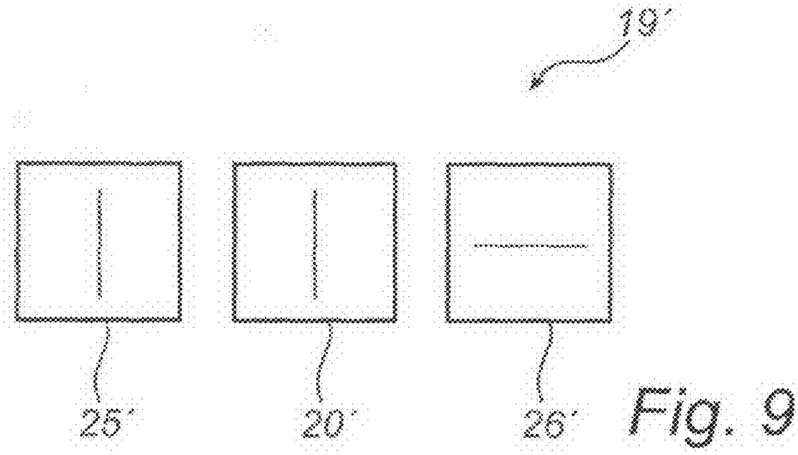
FIG. 9 illustrates schematically such an LC cell, arranged according to a first embodiment of the invention.

The general design principle for the LCD element 19' of the first embodiment is thus the following, as indicated in FIG. 9. Using a non-twisted LC layer 20', having a rubbing direction that is parallel to the polarising axis of the rear polariser 25', and using crossed or parallel rear 25' and front 26' (analyzer) polarisers.

The second embodiment comprises a twisted nematic (TN) LCD cell, with a low retardation value. This means that, at low driving voltages, only a limited grey scale modulation is possible. In practice, as will be shown below, a nearly black state may achieved, in the normal direction, at 3V, and almost no further modulation is achieved at higher voltages. At oblique angles however the path through the LC material is longer and the average angle between the polarisation axis and the LC director will be larger and hence a greater effective modulation is achieved, as will be shown in the below example. Note that the rubbing directions are 45° and 135°, ensuring a mid-plane LC director orientation of 90°, while the polariser directions are 0° and 90°. This ensures right-left symmetry as regards the viewing angle. By mid-plane LC director is meant the orientation of the LC molecules in the plane half-way between the two substrates.

A simulation of the second embodiment has been carried out using the following parameters.

| | |
|---|---|
| K1 (splay elastic constant) | 11.63 pN |
| K2 (twist elastic constant) | 8.5 pN |
| K3 (bend elastic constant) | 16.109 pN |
| $\epsilon\perp$ (perpendicular dielectric constant) | 3.0 |
| $\epsilon\|\|$ (parallel dielectric constant) | 8.51 |
| $\Delta\epsilon$ (=$\epsilon\|\|$ − $\epsilon\perp$ = dielectric anisotropy) | 5.51 |
| d (LC layer thickness) | 2.5 μm |
| front director(azimutal orientation) | 45.0° |
| rear director(azimutal orientation) | 135.0° |
| twist angle | 90° |
| pretilt angle | 2.5° |
| $n_o$ (parallel refractive index) | 1.5 |
| $n_e$ (perpendicular refractive index) | 1.6 |
| $\Delta n$ (=$n_e - n_o$ birefringence) | 0.1 |
| d$\Delta$n (retardation) | 250 nm |
| dispersion | 0.21 |
| reference wavelength | 520 nm |
| polarizer(azimutal orientation) | 90° |
| analyzer(azimutal orientation) | 0° |

Figure 6:
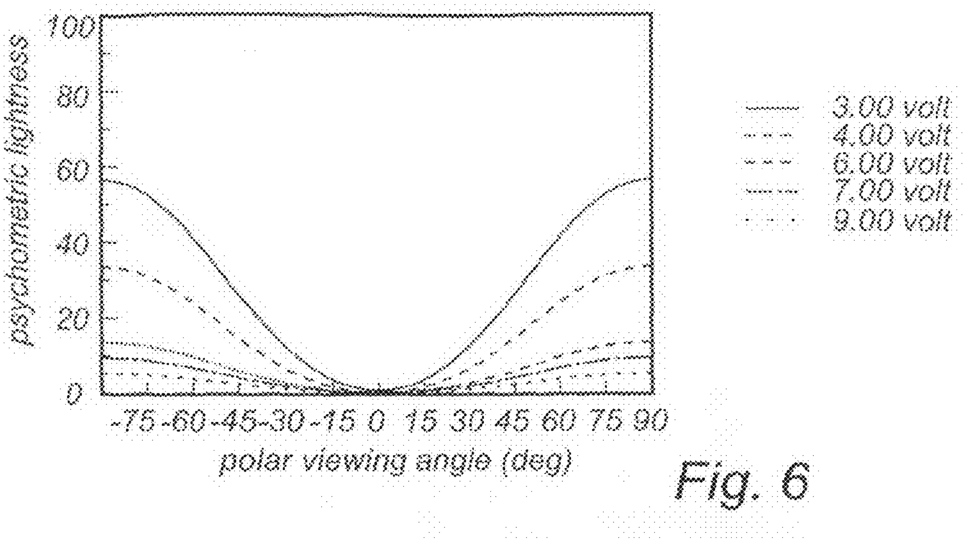
FIGS. 6 and 7 illustrate the results of a simulation of an LCD cell, designed for a display device in accordance with a second embodiment of the invention.
Figure 7:
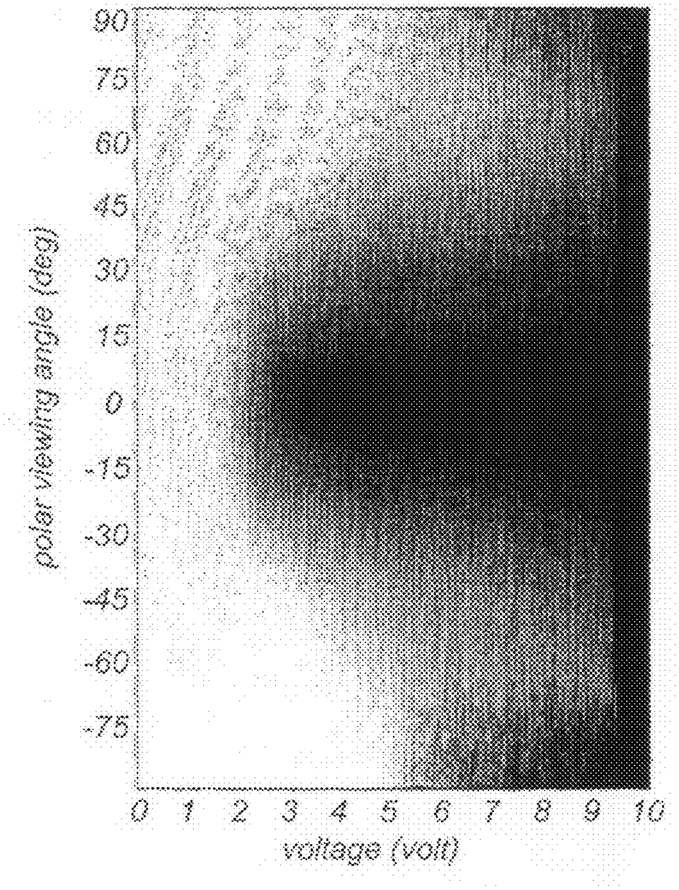

FIGS. 6 and 7 illustrate results of a simulation of an LCD cell in accordance with a second embodiment of the invention, having the above parameters. As can be seen a similar angle to contrast ratio as in FIG. 4 may be obtained by choosing suitable driving voltages, e.g. 3-9 Volt. As is clear from FIG. 7, an absolute minimum operation voltage below 3V should be avoided.

Figure 10:
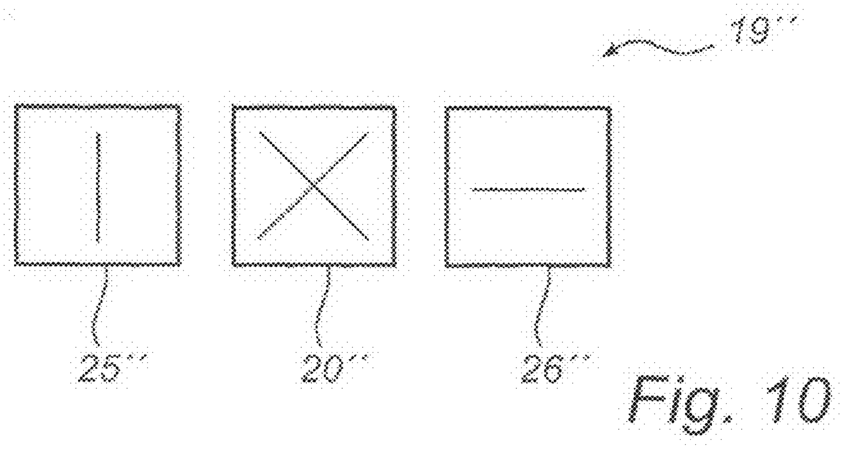
FIG. 10 illustrates schematically such an LC cell, instead arranged according to a second embodiment of the invention.

The general design principle for the LCD element 19" of the second embodiment is thus the following, as indicated in FIG. 10. Using, between crossed polarisers 25", 26", a 90° twisted LC layer 20", having a mid plane LC director in the azimutal angle of 90° or 270°, to ensure symmetrical viewing conditions in the left and right directions (in desired). Using a small effective retardation (preferably d$\Delta$n<450 nm or even more preferred <300 nm), that provides modulation only in oblique angles where the optical path length is longer. Modulation at oblique angles can be achieved by providing very large pre-tilt angles or by using higher absolute voltages than a threshold voltage, in the above example over 3V.

Both embodiments described have a number of features in common, which is the reason that they work as desired. The first common property is that, for light travelling in a normal or close to normal direction (i.e. polar angle close to 0°), there is either no electric-optical effect or this effect is very small, "small" here meaning small in comparison with light travelling at oblique viewing angles, directed towards the left/right viewers. In the first embodiment this is realized by avoiding a twist in the LC layer, and by orienting it parallel or perpendicular to the rear polariser, so that, when a voltage is applied over the electrodes and a tilt in the LC layer is induced, the polarization of the light traversing the LC layer is only modified for light rays under oblique angles. For these oblique light rays a "pure tilt" will be experienced as a mixture of "tilt" and "azimutal reorientation", but not for normally directed rays.

In the second embodiment the same effect is obtained by making sure that the average azimutal director orientation is also parallel to the polariser and independent of driving voltage. This is achieved by choosing the LC director orientations at both substrates opposite to each other and symmetrically with respect to the polariser orientation, e.g. from +45° to +135°.

A second point both embodiments have in common, is that both are driven with voltages within such a range of values, that voltage dependent electro-optical effects do not occur for rays close to the normal direction. In the case of the first embodiment, all values of voltage are allowed, since this is a special case, in which the LC molecules are always oriented azimuthally parallel to the polariser. In case of the second embodiment, there would be a potential problem: the lower half of the LC layer has azimutal orientations in the range 45°-90°, and the upper half of the LC layer has azimutal orientations in the range 90°-135°. Although on average the entire LC layer may be seen to have azimutal orientation of 90°, this averaging effect can be made more exact by always applying a minimum absolute voltage to the LC layer, as to induce a default nonzero tilt value, much larger than any pre-tilt. In the example described in the inventors found that for the given LC, a voltage of at least 3V gives satisfactory results. Therefore, the driving voltages should range from 3-10V instead of the usual 0-5 volts. Of course, the exact value of this required minimum voltage depends on the LC material parameters, especially the elastic constants and viscosity.

In summary, the invention relates to a display device, intended to display different images in different angular regions in front of the display, i.e. a first image to the right and a second image to the left. The display device therefore comprises an imaging layer and a light directing layer, comprising e.g. cylindrical lenses. In order to avoid cross-talk close to where the different regions intersect, the imaging layer comprises liquid crystal cells, which, close to the normal direction of the imaging layer have low contrast and/or brightness. This substantially eliminates cross-talk between the two displayed images.

The invention is not restricted to the described embodiments. It can be altered in different ways within the scope of the appended claims.

The invention claimed is:

1. Display device, comprising an imaging layer with a plurality of picture elements, disposed in a plane, and a light directing layer, comprising a plurality of optical elements, for projecting light from different picture elements in the imaging layer to the left and right, respectively, from an intermediate direction at or close to the normal of said plane, wherein each picture element comprises an LCD element, which is arranged to have lower contrast and or brightness at a viewing angle close to said intermediate direction than at a larger viewing angle from said intermediate direction, wherein the LCD element is a non-twisted liquid crystal cell, having a rear orientation layer having a first parallel rubbing direction, and a front orientation layer having a second parallel rubbing direction.

2. Display device according to claim 1, wherein the LCD element is a non-twisted liquid crystal cell between crossed rear and front polarisers.

3. Display device according to claim 1, wherein the LCD element is a non-twisted liquid crystal cell between parallel rear and front polarisers.

4. Display device according to claim 1, wherein the first rubbing direction of the rear orientation layer is parallel with the polarising direction of the rear polariser.

5. Display device according to claim 1, wherein the first rubbing direction of the rear orientation layer is perpendicular to the polarising direction of the rear polariser.

6. A display device, comprising an imaging layer with a plurality of picture elements, disposed in a plane, and a light directing layer, comprising a plurality of optical elements, for projecting light from different picture elements in the imaging layer to the left and right, respectively, from an intermediate direction at or close to the normal of said plane, wherein each picture element comprises an LCD element, which is arranged to have lower contrast or brightness at a viewing angle close to said intermediate direction than at a larger viewing angle from said intermediate direction, wherein the LCD element is a twisted liquid crystal cell having a retardation value (dΔn) less than 450 nm in said intermediate direction.

7. Display device according to claim 6, wherein the LCD cell is driven with a minimum absolute driving voltage.

8. Display device according to claim 1, wherein the optical elements comprise cylindrical lenses.

9. Display device according to claim 1, wherein the optical elements comprise vertical slits in a barrier.

10. Display device according to claim 1, wherein the intermediate direction coincides with the normal of the imaging layer.

11. Display device according to claim 6, wherein the orientation of a midplane director of the liquid crystal cell's liquid crystal material is vertical.

* * * * *